United States Patent [19]

Wiegner

[11] Patent Number: 4,485,462

[45] Date of Patent: Nov. 27, 1984

[54] TRANSDUCER MOUNTING APPARATUS

[75] Inventor: Egon Wiegner, Kiel, Fed. Rep. of Germany

[73] Assignees: Honeywell Elac-Nautik GmbH, Offenbach, Fed. Rep. of Germany; Honeywell Elac-Nautik GmbH, Offenbach, Fed. Rep. of Germany

[21] Appl. No.: 426,534

[22] Filed: Sep. 29, 1982

[51] Int. Cl.[3] .................... G01S 7/52

[52] U.S. Cl. .................... 367/12; 367/104; 367/173

[58] Field of Search .................... 367/12, 104, 120, 165, 367/173; 181/123, 124, 139, 140

[56] References Cited

U.S. PATENT DOCUMENTS

| | | | |
|---|---|---|---|
| 2,829,360 | 4/1958 | Allyn | 367/173 |
| 2,881,408 | 4/1959 | Dudley | 367/104 |
| 3,454,923 | 7/1969 | Currie | 367/173 |
| 3,553,638 | 1/1971 | Sublett | 367/12 |

FOREIGN PATENT DOCUMENTS

| | | |
|---|---|---|
| 2803617 | 4/1979 | Fed. Rep. of Germany . |

*Primary Examiner*—Richard A. Farley
*Attorney, Agent, or Firm*—Charles L. Rubow; Charles L. Rubow

[57] ABSTRACT

Apparatus for remotely controlling the horizontal and vertical direction of a pendulously suspended transducer by means of concentric generally vertical control shafts is disclosed. A frame in which the transducer is mounted for rotation about a tilt axis is pendulously suspended from one control shaft. The other control shaft is rotatably coupled through a universal joint to a first pulley mounted in the frame for rotation about a vertical axis. The first pulley is rotatably coupled to a second pulley mounted on the transducer for rotation therewith about the tilt axis by means of a cable routed over guide pulleys which change cable direction.

6 Claims, 1 Drawing Figure

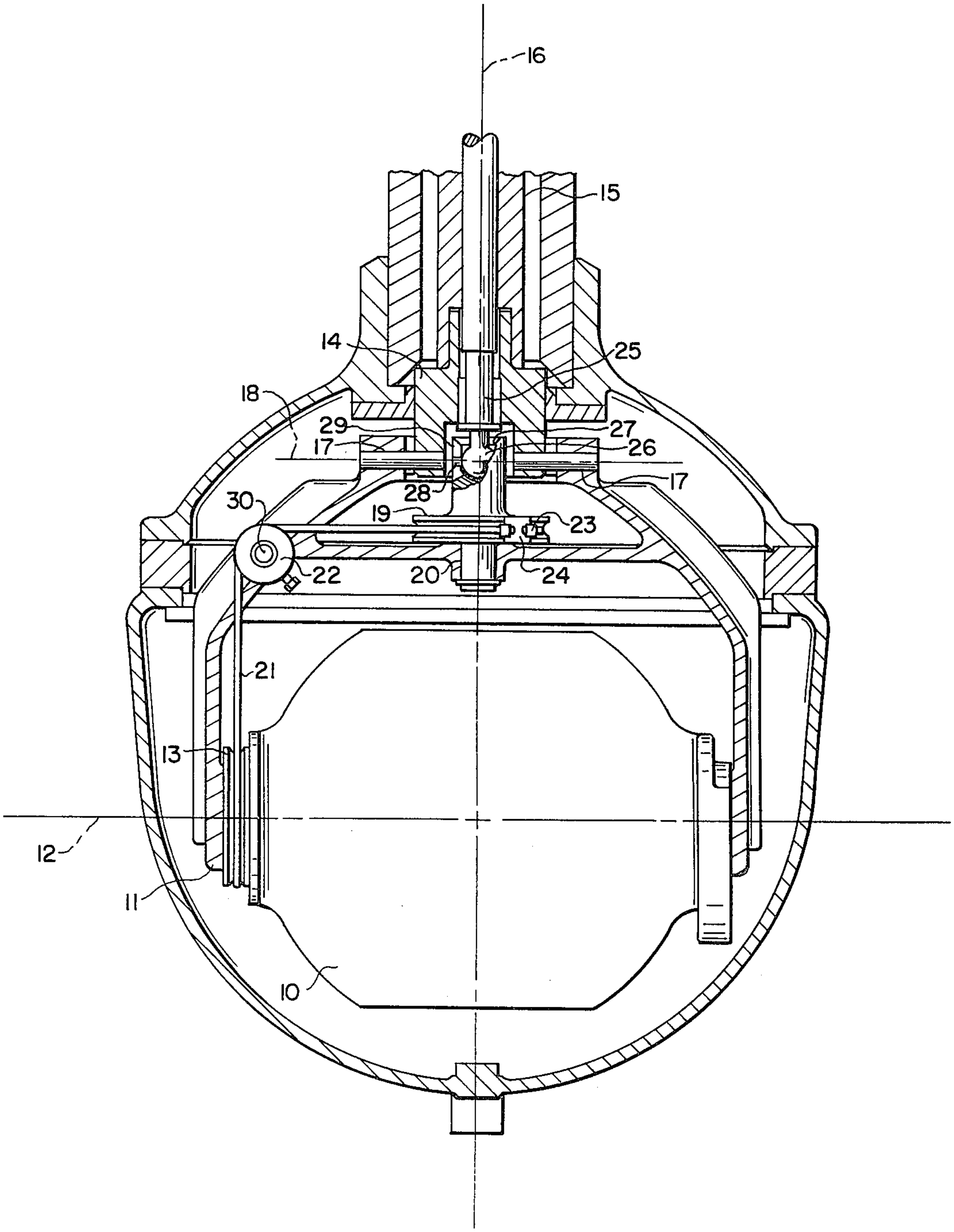
16
15
14
25
18
29
27
17
26
28
17
30
19
23
22
20
24
21
13
12
11
10

TRANSDUCER MOUNTING APPARATUS

BACKGROUND OF THE INVENTION

The invention disclosed herein relates generally to motion converting mechanisms, and more particularly to transducer mounting means for varying the vertical and horizontal directions of a transducer in response to motions of control shaft means.

Mechanisms for remotely producing rotation of an object about two mutually perpendicular axes are required in a number of varied applications. One such application is in the echo sounding field in which it is necessary to control the beam direction of an electroacoustic transducer typically located underwater, outside the hull of a marine vessel from a control station located inside the vessel. Echo sounding apparatus of this type is frequently designed such that the transducer and stem on which it is mounted can be retracted into the vessel. Since it is important that any perforations of the vessel hull be kept as small as feasible, transducer apparatus of the type described above should be compact.

In many common echo sounding transducer applications the transducer must be rotatable throughout 360° in a horizontal plane, and tiltable throughout a significant vertical range. Further, it is important that the transucer maintain any direction to which it is set. Achieving this requirement is complicated by the fact that a marine vessel does not provide a stable platform for fixed mounting of the transducer.

Oscillation of the vessel about an axis parallel with the beam axis of the transducer has only a relatively minor effect on transducer beam direction. However, oscillation of the vessel about an axis perpendicular to the transducer beam axis has a substantial effect on beam direction, and must be compensated for. It is, of course, possible to continuously sense vessel orientation relative to some fixed reference and to continuously reposition the transducer relative to the vessel to compensate for vessel movement. Such a compensation system is relatively complex and expensive, and desirably should be avoided.

A simpler approach is to pendulously suspend the transducer from the vessel at least about an axis parallel with the tilt axis of the transducer. Where a pendulous transducer mounting is used and transducer direction is controlled by rotatable shaft means, it is necessary to provide for transmitting vertical and horizontal transducer control motions across a joint which allows relative movement between the transducer and vessel. For obvious reasons, it is desirable to keep the transducer mount and directional control mechanism as simple as possible.

A variety of mechanisms for achieving rotation of an electroacoustic transducer about two orthogonal axes are known. For example, German Pat. No. 28 03 617 discloses echo sounding apparatus having an electroacoustic transducer tiltably mounted about a horizontal tilt axis in a pendulously suspended frame.

The mechanism for varying the direction of the transducer in horizontal and vertical planes comprises a pair of concentric vertical control shafts. The frame is carried on one of the shafts so as to be rotatable with that shaft about a vertical axis. Tilt of the transducer is achieved by means of a pinion coupled to the other control shaft. The pinion meshes with a gear segment fixed to the back of the transducer so that rotation of the shaft causes rotation of the transducer about the tilt axis.

Such an arrangement is satisfactory for rotating the transducer about mutually perpendicular axes. However, it requires a special pinion gear and mating gear segment. Such a gear arrangement is not uncommon, but does require gears which are inherently more difficult to form than other simpler mechanism.

More importantly, the gear arrangement must occupy a location centered behind the transducer and located generally above and/or behind the transducer tilt axis. Accordingly, as the transducer tilts, it swings in an arc, and thus requires somewhat more space for tilting purposes than if it were centered on the tilt axis. The transducer assembly also generally tends to be unbalanced about the tilt axis because the center of gravity of transducer is generally offset from directly below the tilt axis. This unbalance varies with the tilt direction of the transducer. It also requires maintaining of a positioning torque on the tilt control shaft, which, in turn, must be opposed by a counter torque on the horizontal position control shaft in order to maintain a desired transducer beam direction.

Other mechanical arrangements for remotely achieving rotation about two orthogonal axis are shown in U.S. Pat. Nos. 2,829,360, 2,881,408 and 3,454,923 respectively issued to R. Allyn on Apr. 1, 1958, J. Dudley on Apr. 7, 1959 and W. Currie on July 8, 1969. The mechanisms disclosed in each of these patents includes a single control shaft which is rotatable about and translatable along a vertical axis. Rotation of the control shaft causes rotation of the transducer in a horizontal plane. Translation or linear motion of the control shaft controls tilt of the transducer in a vertical plane. The mechanisms shown in the first two of these patents suffer from unbalance of the transducer about the tilt axis in a manner similar to that described for the mechanism of German Pat. No. 28 03 617, although they do avoid unbalance induced coupling between motions about the horizontal and vertical axes.

The mechanism disclosed in the third patent avoids unbalance of the transducer assembly by centering the transducer on the tilt axis and fitting a pinion on the end of a shaft which extends along the tilt axis. The pinion meshes with a rack gear, and is vertically movable relative thereto in response to linear motion of the control shaft so as to rotate the transducer about the tilt axis. Pendulous mounting is not provided by any of the mechanisms shown in the U.S. patents. Also, these mechanisms require some means for counteracting the effects of weight of the control shaft.

The applicant has devised a unique mechanism for controlling the rotation of a pendulously suspended transducer about horizontal and vertical axes which avoids the above noted disadvantage of prior art mechanisms. Specifically, the mechanism is compact so as to require minimum space for rotation about horizontal and vertical axes. It is inherently simple and inexpensive to manufacture, in that it does not utilize gear arrangements. Finally, the transducer is supported in a balanced manner so as to avoid problems resulting from torques which tend to cause the transducer deviate from its desired orientation.

SUMMARY OF THE INVENTION

The present invention is a mechanism for remotely controlling the direction of a pendulously suspended transducer or other object about vertical and horizontal axes. It utilizes a pendulously suspended frame rotatable about a generally vertical axis and adapted to support a transducer for rotation about a horizontal tilt axis. The frame carries first pulley means mounted for rotation about the vertical axis, the first pulley means being coupled to second pulley means fixed to the transducer. Coupling of the two pulley means is accomplished by cable means which is routed around guide pulley means whose periphery is tangent to planes containing the first and second pulley means respectively. The first pulley means is rotatably coupled to a vertical tilt control shaft through universal joint means centered on the support axis of the pendulously suspended frame.

BRIEF DESCRIPTION OF THE DRAWING

The single FIGURE of the drawing is a view, partically in cross-section, of an electroacoustic transducer having a direction control mechanism in accordance with the applicant's invention.

DESCRIPTION OF THE PREFERRED EMBODIMENT

The drawing shows the lower portion of a retractable electroacoustic transducer head. The transducer, which is identified by reference numeral 10, is mounted in a forked frame 11 for rotation about a horizontal tilt axis 12 by means of low friction pivots between the transducer and frame. A pulley 13 is fixed to transducer 10 concentric with axis 12 and generally lies in a plane perpendicular to axis 12. Frame 11 is pendulously suspended from a collar 14 on the end of a tubular shaft 15 shown extending along a vertical axis 16. Pendulous suspension is achieved by means of pins 17 which extend along a horizontal axis 18 parallel with tilt axis 12. The pins pivotally join collar 14 to the bight of forked frame 11.

The bight of frame 11 also carries a pulley 19 on a stub shaft 20 which extends along vertical axis 16 and is rotatable thereabout in frame 11. Pulleys 13 and 19 are rotatably coupled by cable means 21 which is routed around idler or guide pulleys 22 rotatable about an axis 30 extending perpendicular to axes 12 and 16. Guide pulleys 22 are carried on frame 11 and positioned so that the peripheries thereof are substantially tangent to the planes of pulleys 13 and 19. Pulleys 22, thus, provide for changing the movement of cable means 21 between horizontal and vertical directions.

Cable means 21 may be prevented from slipping on pulleys 13 and 19 by means of retaining collars, such as collar 23, fixed to the cable means and cooperating with slots in the pulleys, such as slot 24 in pulley 19.

An extension of stub shaft 20 is rotatably coupled to a tilt control shaft 25 by means of a universal joint located at the intersection of axes 16 and 18. One suitable form joint comprises a ball 26 on the end of control shaft 25. Ball 26 extends into a socket or cavity 27 in the extension of stub shaft 20. Ball 26 has at least one pin or other projection 28 thereon extending along axis 18. Projection 28 cooperates with a slot or groove 29 machined or otherwise formed in the wall of socket 27 so as to couple rotation of control shaft 25 to stub shaft 20. Ball 26, socket 27, projection 28 and slot 29 effectively form a universal joint which permits stub shaft 20 and control shaft 25 to deviate from axial alignment while providing for rotary coupling.

A cover or housing, of which at least part is substantially transparent to acoustical energy, surrounds and protects transducer 10 and its directional control mechanism.

Although a particular embodiment of the applicant's unique mechanism for rotating a pendulously suspended device about horizontal and vertical axes is shown for exemplary purposes, it should be understood that a number of other variations and modifications will be apparent to those familiar with the relevant arts. It is intended that coverage of the invention not be limited to the embodiment shown, but only by the terms of the following claims:

The embodiments of the invention in which an exclusive property or right is claimed are defined as follows:

1. Echo sounding apparatus of the type having a pendulously suspended frame rotatable about a vertical axis in which an electroacoustic transducer is mounted for tilting about a horizontal tilt axis, the tilt angle of the transducer being controllable by a generally vertical, rotatable tilt control shaft connected to rotate a first driving element coupled to the tilt shaft and mounted in the frame, and a second driving element for converting the rotation of the first driving element into tilting movement of the transducer, wherein the improvement comprises;

first pulley means rotatably coupled to said tilt control shaft and rotatable in said frame about a generally vertical axis;

second pulley means connected to said electroacoustic transducer for rotating said electroacoustic transducer about a first generally horizontal axis;

cable means coupling said first and second pulley means; and guide pulley means for converting movement of said cable means between horizontal and vertical directions, whereby rotation of said tilt control shaft about a vertical axis causes rotation of said electroacoustic transducer about a horizontal axis.

2. The echo sounding apparatus of claim 1 wherein said first pulley means is rotatably coupled to said tilt control shaft by means of a ball with at least one substantially horizontal projection thereon fixed to one of said first pulley means and said tilt control shaft, said ball being located in a socket fixed to the other of said first pulley means and said tilt control shaft, the socket wall having groove means therein cooperating with the horizontal projection on said ball so that rotation of said tilt control shaft causes rotation of said first pulley means.

3. The apparatus of claim 2 wherein the projection on said ball extends along an axis coincident with the axis about which said frame is pendulously suspended.

4. The apparatus of claim 2 or 3 wherein:

said ball is fixed to said tilt control shaft; and said socket is fixed to said first pulley means.

5. The apparatus of claim 1 wherein:

said cable means is fitted with collar elements at fixed locations thereon for engaging at least said first pulley means; and at least said first pulley means is formed with a slot for engaging at least one of said collar elements to ensure against slippage of said cable means on said first pulley means.

6. The apparatus of claim 1 wherein said guide pulley means comprises a pair of pulleys between said first and second pulley means carried on said frame for rotation about a second generally horizontal axis perpendicular to the first generally horizontal axis, said pair of pulleys being positioned so that the peripheries thereof are substantially tangent to the planes containing the peripheries of said first and second pulley means.

* * * * *